(No Model.)

F. E. FISHER.
ANNUNCIATOR.

No. 336,001. Patented Feb. 9, 1886.

ATTEST
Geo. W. Reid
Jno. C. Grout

INVENTOR
Frank E. Fisher
by Geo. H. Lothrop
atty

UNITED STATES PATENT OFFICE.

FRANK E. FISHER, OF DETROIT, MICHIGAN.

ANNUNCIATOR.

SPECIFICATION forming part of Letters Patent No. 336,001, dated February 9, 1886.

Application filed July 14, 1885. Serial No. 171,600. (No model.)

*To all whom it may concern:*

Be it known that I, FRANK E. FISHER, of the city of Detroit, in the county of Wayne and State of Michigan, have invented a new and useful Improvement in Annunciator-Drops, of which the following is a specification.

My invention consists in an improvement in annunciator-drops intended to work with alternating currents of electricity, and is hereinafter fully pointed out in the claims.

Figure 3:
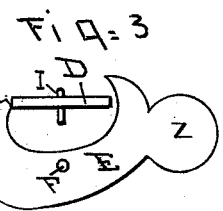
Figure 1:
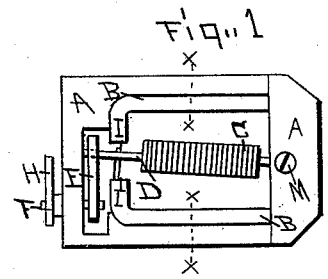
Figure 2:
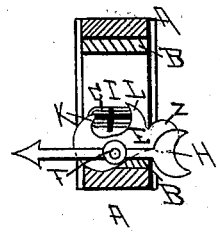

Figure 1 is a side elevation; Fig. 2, a front elevation with the frame broken away on the lines *x x,* Fig. 1; and Fig. 3 is an enlarged view of the end of the armature and the weighted drop.

B represents a permanent magnet, U-shaped, and with its poles turned toward each other.

A represents a frame made of diamagnetic soft metal—such as lead or type-metal—cast in a mold around the magnet B, and having at the bend of the magnet a lug on each side of the magnet wider than the thickness of the magnet, between which is pivoted one end or pole of an electro-magnet consisting of a piece of soft iron, D, wound with a helix of insulated wire, C.

M represents one of two pointed screws, one of which is tapped through each lug on the frame A, and whose point enters a shallow hole in the side of the part D of the electro-magnet, thus pivoting said electro-magnet between the screws M, and leaving the other end or pole thereof free to vibrate between the poles of the permanent magnet. The free end of the electro-magnet passes between the poles of the permanent magnet and extends a short distance beyond them, as shown in Fig. 1.

I represents a pin made of diamagnetic material, set in the part D of the electro-magnet between the poles of the permanent magnet, and is preferably made longer on one side of the electro-magnet than on the other, as shown, to hold the electro-magnet nearer the upper pole of the permanent magnet, and to permit the proper adjustment of the electro-magnet with reference to the catch of the drop. The pin I also serves to prevent the electro-magnet from coming in contact with the permanent magnet and sticking thereto.

F represents a shaft journaled in the frame A, beyond the end of the permanent magnet, and extending beyond the end of said frame and into a recess formed in the frame just forward of the end of the permanent magnet, and the end of the electro-magnet also extends into this recess, as clearly shown in Fig. 1. On the inner end of shaft F is secured a weighted catch, E, which has at one end a hook, K, adapted to engage with the end of the electro-magnet D, as shown in Fig. 3, when the free end of said electro-magnet is in its lowest position, and at its other end has a weighted extension, Z, so that when left free said catch will rotate said shaft F until the weighted end Z comes in contact with the frame at the lower side of the recess in which it is placed. On the outer end of shaft F is secured a needle or pointer, H, which is operated by the motion of shaft F.

The operation of my invention is as follows: The free end of the electro-magnet being at its lowest position and sustained there by the longer end of pin I resting on the lower pole of the permanent magnet, it will engage with hook K and hold the catch E and needle H horizontal, as shown in Figs. 1 and 2. Now, if the upper pole of the permanent magnet be positive, on passing an alternating current through the helix of the electro-magnet, the part D thereof will be magnetized, and its two ends will become poles, which change with every reversal of the current. As soon as the free end of the electro-magnet becomes negative, it will be attracted by the positive pole of the permanent magnet and repelled by the negative pole thereof, and will rise so as to release hook K, when the weighted end of catch E will fall by the action of gravity and oscillate shaft F and needle H. As soon as the current ceases, the free end of the electro-magnet falls by the action of gravity until checked by pin I coming in contact with the lower pole of magnet B. On raising catch E, by hand or otherwise, the curved end of hook K raises the electro-magnet until the said magnet falls by gravity behind the point of the hook, and retains the catch and needle in the position shown in Fig. 2, ready for another operation.

What I claim as my invention, and desire to secure by Letters Patent, is—

1. In an annunciator-drop, the combination of a permanent magnet, an electro-magnet pivoted at one pole and having its other pole within the field of force of the poles of the permanent magnet, a weighted catch hung on a movable shaft, and adapted to engage with the movable pole of the electro-magnet, and a needle secured to the shaft which carries the catch, substantially as shown and described.

2. The combination of the permanent magnet B, soft-metal frame A, electro-magnet C D, pivoted at one pole by the screws M, diamagnetic pin I, passing through the electro-magnet, and the pivoted catch E, substantially as shown and described.

FRANK E. FISHER.

Witnesses:
GEO. H. LOTHROP,
M. A. JACKSON.